Aug. 11, 1959     J. DREWE ET AL     2,899,568
IMPULSE GATING DEVICES

Filed July 13, 1954     2 Sheets-Sheet 1

INVENTORS
JOHN DREWE
PETER DOUGHTON ATKINSON
BY Frederick E. Hans
ATTORNEY

United States Patent Office 2,899,568
Patented Aug. 11, 1959

2,899,568
IMPULSE GATING DEVICES

John Drewe, Sandon, near Buntingford, and Peter Doughton Atkinson, Elstree, England, assignors to International Computers and Tabulators Limited, London, England Application July 13, 1954, Serial No. 443,042

Claims priority, application Great Britain August 26, 1953

16 Claims. (Cl. 307—88)

This invention relates to improvements in magnetic devices having two or more stable states.

The object of the invention is the automatic return of such devices from one stable limiting state to the opposite limiting state of saturation. The arrangement has a number of different uses, for example, in a triggered pulse gate and in a magnetic pulse counter of the kind described in co-pending United States patent application No. 419,495 filed March 29, 1954, now abandoned.

According to the invention, a magnetic core may be automatically reset to a first limiting state of saturation, consequent upon switching of the core to a second limiting state of saturation and comprises a magnetic core of material with appreciable remanence and a substantially rectangular hysteresis characteristic, a source of input pulses for switching the core from said first state to said second state, means for applying the said pulse to a first winding on the core, a capacitor in series with said winding, and means permitting the uni-directional discharge of the capacitor through a winding in a direction to switch said core to the first state of saturation, the voltage time integral produced across the winding by the discharge of the capacitor when it has been charged by a pulse which drives the core into the second state of saturation, being sufficient to switch the core from the second state to the first state of saturation. Alternatively, the capacitor may be placed in series with a second winding on the core in lieu of in series with the first winding on the core. The uni-directional discharge of the capacitor may be through either the first winding or a third winding, the voltage time integral produced across the said first or third winding by the discharge of the capacitor, when it has been charged by a pulse which drives the core into the second state of saturation, being sufficient to switch the core from the second to the first state of saturation. Further, the pulses applied to the first winding on the core may be such as to produce a series of incremental changes in the magnetic state of the core, the pulse which finally drives the core into saturation being alone effective to charge the capacitor to an extent sufficient to provide a voltage time integral sufficient to effect the return of the core from the second to the first state of saturation.

The invention will now be described by way of example with reference to the accompanying drawings in which—

A single electrical pulse which may occur at any of ten different times in a cycle is frequently used to represent the values 0 to 9 and arises in the electrical sensing of punched record cards. It is desired to deliver a train of pulses having substantially constant voltage time integrals such as are suitable for the operation of the pulse counter described in the aforesaid co-pending application, in which the number of pulses in a train correspond to the value represented by the timed pulse.

Figure 1:
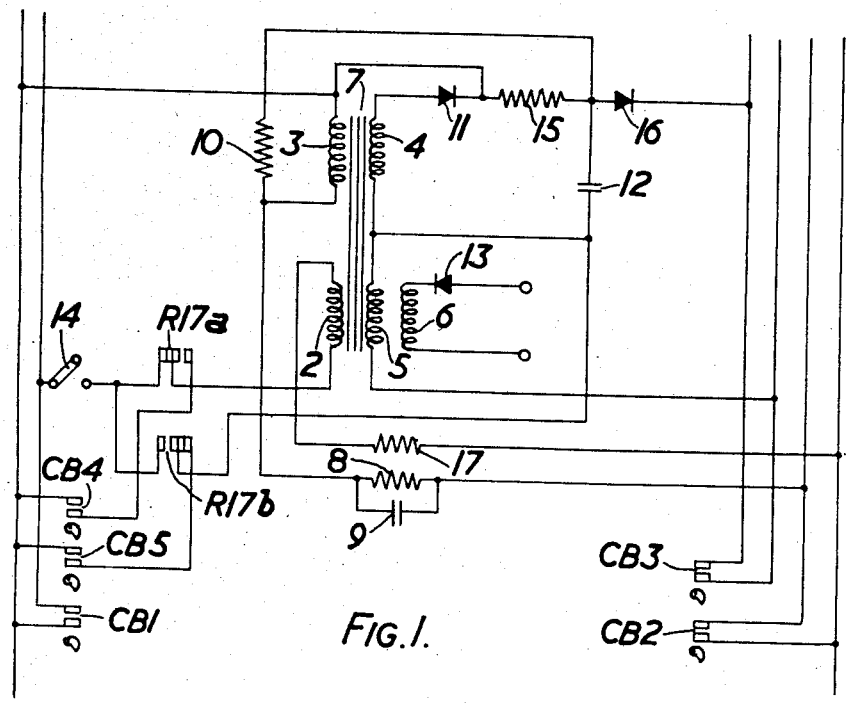
Figure 1 shows a bi-stable magnetic pulse gating device with automatic reset in a circuit suitable for use in conjunction with pulses employed in "Hollerith" (Regd.) punched card accounting, i.e., in which the pulses in each denomination represent values by their number.
Figure 3:
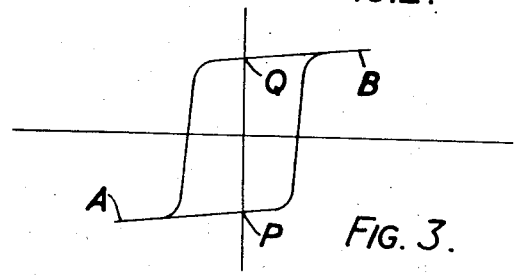
Figure 3 shows a substantially rectangular hysteresis curve, the magnetic field being placed horizontally and the magnetic induction vertically.

The bi-stable magnetic device shown in Figure 1 comprises a magnetic core 7 which is conveniently toroidal. This core 7 has a substantially rectangular hysteresis curve such as that shown in Figure 3. The core may be constructed of "Permalloy F." which is described in volume 150, No. 3889 of "Electrical Review" for June 6, 1952, or other material having like characteristics. On this core are five similar windings, a start winding 2, a pulse winding 3, a store winding 4, a reset winding 5 and an output winding 6. Assuming a current has been applied to one of these windings to produce a field far in excess of the coercive force, then the core will be in one of its two stable states indicated by "P" and "Q" respectively in Figure 3 according to the direction of the magnetomotive force. It will be assumed, further, for definition, that positive pulses applied to the start winding 2 put the core in the "Q" state.

Figure 2:
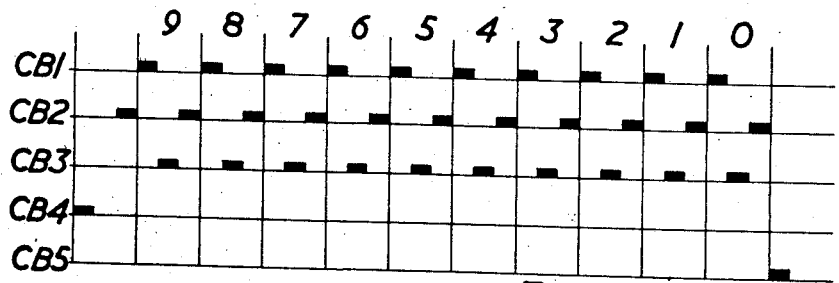
Figure 2 is a timing chart relating to Figure 1.

If the core 7 were initially in the "P" state, then upon closing of cam contacts CB1 and switch 14 a circuit is completed from the positive line contacts CB1, switch 14, closed contacts R17a, winding 2 (start) to resistance 17 to negative line, which will cause the core to change from state "P" to state "Q." CB3 cam contacts next close, but as capacitor 12 is not charged effects no change. Pulses are applied to the pulse winding 3 in a sense adapted to change the state of the core from "Q" to "P" via "A" controlled by cam contacts CB2. These are timed to occur after the pulses controlled by CB3 (Figure 2). The circuit is positive line, winding 3, capacitor 9 with resistance 8 in parallel, cam contacts CB2 to negative line. The capacitor 9 allows a substantial initial current to flow and the resistance 8, while not permitting an excessive drain on source of current, discharges the capacitor upon the opening of CB2. This changing of the state of the core induces currents in the other windings.

Storage winding 4 is connected via a diode 11 and a resistance 15 to a capacitor 12 with the diode 11 connected in such a sense that the change of the core 7 from state "Q" to "P" charges the capacitor. The reset winding 5 circuit is not complete at this time, as cam contacts CB3 are open. The output winding 6 will have negative pulses induced therein and it is preferred not to utilise these and these may be suppressed by a diode 13. Upon completion of the pulse on winding 3 the cam contacts CB3 close, completing a discharge circuit through the diode 16 for the capacitor 12 through the winding 5 in a sense to change the state of the core from "P" via "B" to "Q."

This reset of the core back to the state obtaining before the input pulse on winding 3 occurred, also creates a pulse in a sense permitted by diode 13 in the output winding 6. Such pulses will have a substantially constant voltage time integral, as this integral is independent of the value of the voltage on capacitor 12, provided sufficient energy is stored in capacitor 12 to produce a change of the core state from "P" via "B" to "Q." The generated pulse is governed by the characteristic curve and the dimensions of the core and number of turns on the winding.

If the core started in the "P" state and no pulse had been applied to the start winding 2, the pulses applied to the winding 3 would have failed to produce charging of the capacitor 12, as the state of the core would only change from "P" to "A" and back again. To compensate for any tendency for such repeated ineffective pulsing to produce an output when the state of the core alters from "P" to "A," due to imperfect rectangularity of the characteristic curve of the core material, the resistance 15 is provided between diode 11 and capacitor 12 to provide a back-bias on the diode 11 of greater amplitude than this spurious output, and so prevent build up of a charge on capacitor 12. This back-bias is provided by tapping off a part of the pulse voltage applied to winding 3, and is governed by resistors 15 and 10.

Alternatively, the same result can be obtained by placing the resistor 10 or a corresponding inductance between the positive line and winding 3. The voltage will then be substantially developed across the resistor 10 or inductance, as the winding 3 will present a low impedance when the core is already magnetised in the "P" state. This alternative arrangement may however, require a larger input pulse to compensate for the voltage developed across the resistor 10 when the winding 3 is in its high impedance state due to the core being magnetised in the "Q" state.

Assuming the core has been set by a start pulse to state "Q" and pulses are being applied repeatedly to the winding 3, termination of output pulses on the winding 6 is effected by preventing the capacitor resetting the core to the "Q" state after being charged due to an input pulse changing the core state from "Q" to "P." This is readily effected by discharging the capacitor 12 before cam contacts CB3 close. The capacitor 12 is connected via closed contacts R17b, the cam contacts CB5, positive line and the bias resistor 15 to effect discharge.

With the device employed in a machine having record card sensing means, the cams are driven in synchronism with the card feeding and sensing so that the contacts controlled by CB1, CB3, CB2 operate in sequence once for each index point, and CB5 operates after "0" to switch the device off. A record card presented to the machine, "9" edge leading, has a perforation in a column read under control of CB1 impulses. Each possible data position representing 9, 8, 7, 6, 5, 4, 3, 2, 1, 0 is scanned in turn. The brushes make contact with a sensing roll at an index point time in the cycle governed by the card perforation. With the core initially in the "off" or "P" state CB2 pulses are ineffective to produce an output. Hence, value "2" in a card column is sensed at the "2" index point and is diagrammatically represented by the closing of switch 14 in Figure 1 at the beginning of "2" index point to allow a CB1 pulse to be applied to the start winding. The two CB2 pulses following result in two output pulses at CB3 timing at "1" and "0" index points respectively. After "0" in the machine CB5 is closed, allowing the capacitor 12 to discharge and so rendering any further CB2 pulses ineffective.

If instead the sensing circuit provides the "stop" signal in replacement of CB5 in the circuit of Figure 1, and cam contacts CB4 provide a "start' signal before "9" index point in the machine cycle in replacement of switch 14, the complementary number of pulses is read out for each value sensed. This is effected by changing over of relay contacts R17a and R17b. Figure 1 shows one bi-stable device in circuit, and like circuits may be assembled in parallel to deal with a plurality of columns or denominations, the diode 16 being inserted to prevent back circuits.

The start winding 2 also produces a pulse in the sense permitted by diode 13 in the output winding, whereas only those generated by the capacitor 12 discharging through winding 5 are required in the output winding 6. These unwanted pulses are conveniently eliminated from the output by a circuit breaker connected in series with the winding 6 open at times cam contacts CB1, CB4, CB5 are closed.

An arrangement suitable for producing 10 milli-volt-seconds integral pulses (100 volt, 100 microseconds) may comprise a toroidal core of "Permalloy F." having 1½ inches outside diameter and ¼ x ¼ inch cross section wound with five windings each of 100 turns. Appropriate circuit values are:

| | |
|---|---|
| Resistance 8 | ohms 1,000 |
| Resistance 10 | do 1,000 |
| Resistance 15 | do 100 |
| Resistance 17 | do 7,500 |
| Capacitor 9 | microfarads 2 |
| Capacitor 12 | do 2 |

In this arrangement of the bi-stable device and circuit the input pulses of 100 volts must have a duration in excess of 100 microseconds to ensure correct operation of the reset circuit.

It will be noted that all windings have preferably a similar number of turns. The reasons for this and for the selection of the values given above are set out in greater detail in connection with Figure 5.

The windings in Figure 1 each performs a separate function and for some uses it is convenient to arrange for one winding to effect more than one function.

Figure 4:
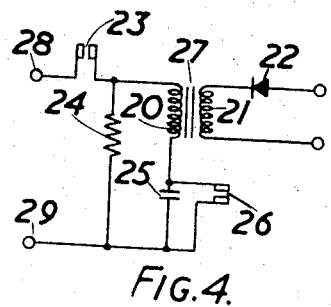
Figure 4 shows an elementary form of the circuit of Figure 1 in which several functions are performed by a single winding.

One elementary mode of combining the windings of Figure 1 is shown in Figure 4. A single input winding 20 (Figure 4) is simultaneously employed to receive the input pulse and to charge a capacitor 25 and subsequently to receive the discharge of the capacitor 25. When contacts 23 (Figure 4) are closed current flows through the primary winding 20 of the transformer from a positive supply line 28 to charge a capacitor 25 connected to the negative supply line 29. If the core is initially in the saturated state "Q" (Figure 3) in which this input pulse is tending to drive it, there will be negligible flux change ("Q," "B," "Q") on account of the rectangularity of the hysteresis characteristic of the core 27 and no output therefor from the winding 21. The pulse data sensing switch 26 across capacitor 25 is assumed open at this time. Upon opening of contacts 23 terminating the input pulse the capacitor can discharge through the input winding 20 and resistance 24 and change the state of the core to its opposite state of saturation "A." The current induced in the output winding by this change of flux is opposed by the diode. At the next input pulse the core state is changed from "P" via "B" to "Q" and an output pulse is generated in the output winding 21 in a sense permitted by the diode 22. The capacitor discharge will once more reset the core from "Q" via "A" to "P." If after the reset and before the next input pulse the switch is closed then at the following input pulse a pulse is generated in the output as before but the capacitor 25 is prevented from charging and consequently the core remains in a saturation state "Q" to which it will return after each further input pulse. It is thus seen that the omission of the start winding results in elimination of the first pulse of a group to be gated into the output.

This loss is, however, made good in that one further pulse is gated into the output after closing of switch contacts 26. In this way the number of pulses gated may remain proportioned to the number of pulses applied whilst switch 26 is open, but the total does not appear in the output until one pulse time later. It will be seen from the foregoing that for punched card applications the switch 26 is opened at a digital index point and must remain opened until "0" in the card cycle.

Figure 6:
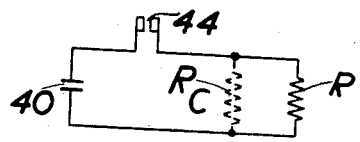
Figure 6 shows an equivalent circuit of the counting core resetting circuit of Figure 5.
Figure 5:
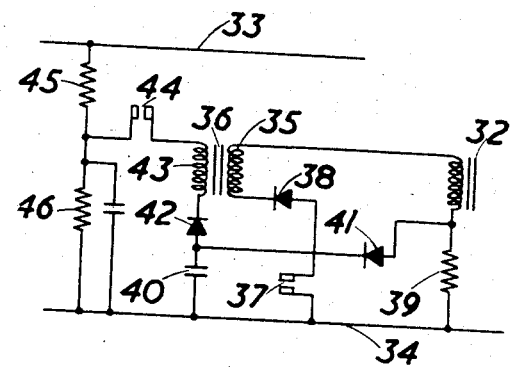
Figure 5 shows the application of automatic reset to a counting core.
Figure 7:
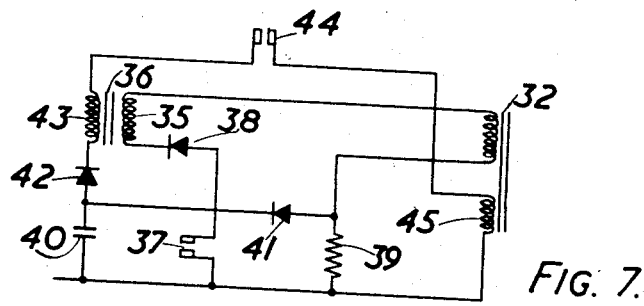
Figure 7 shows a modification to the resetting circuit of Figure 5.

Figures 1 to 4 have shown the application of the reset to a pulse gate. Figures 5 to 7 show the application of the reset to a counting core similar in character to the gate core save that the pulses applied are constant voltage time integral pulses which are adapted to advance the core only by successive steps from a first saturation state to an opposite saturation state. The input to the counter may be from a transformer as described in the aforesaid patent application No. 419,495 or from the output of a pulse gate as described by reference to Figures 1 to 4 herein. The output pulses from the transformer 32 (Figure 5) secondary winding have a constant voltage time integral and are applied to a winding 35, on a counting core 36, through a resistor 39, contacts 37 and a diode 38. If the core is counting in decimal, the winding 35 has a number of turns such that each pulse produces in the core 36 a change in the magnetic state which is approximately one-tenth that of the change from saturation in one direction to saturation in the other direction.

When the core 36 is not driven into saturation by a pulse, the impedance is relatively high, so that a small voltage drop occurs across the resistor 39. This voltage drop charges a capacitor 40, through a diode 41.

The capacitor 40 is also connected to a reset winding 43, of the core 36, through a diode 42. The other end of the winding 43 is connected through contacts 44 to the junction of two resistors 45 and 46, which are connected between the lines 33 and 34. This makes the cathode of the diode 42 more positive than the voltage to which the capacitor is charged (before the core is saturated) so preventing it discharging through the winding 43.

The contacts 37 and 44 are conveniently operated by cams to secure the required timing relationship to the input pulses, as in the case of the timing contacts of the specification referred to. Contacts 37 are closed at the same time as the input pulses, to allow a pulse to be fed to the windings 35. The contacts 44 close immediately after contacts 37 open, and open before the latter contacts close again.

When a pulse from the transformer 32 drives the core 36 into saturation, the impedance of the winding 35 drops to a relatively low value, so that the current through the winding increases and a large voltage drop is produced across the resistor 39. This charges the capacitor 40 to a voltage considerably in excess of the biassing voltage of the diode 42. Consequently, when the contacts 44 close, immediately after this, the capacitor 40 will discharge through the reset winding 43. The flux produced by the current in this winding is such as to switch the core back to the original state of saturation from the state of saturation into which it has just been driven.

The capacitor 40 has to provide sufficient energy to switch the core 36 from one state of saturation to the other. On the other hand, this energy has to come from a source which supplies a pulse which, before saturation is reached, only charges the capacitor to a small voltage and shifts the core 36 by one-tenth of the total excursion of flux density. It might appear, at first sight, that the capacitor cannot be charged sufficiently to effect complete reset.

The fallacy of this approach lies in the fact that it is the voltage time integral of a pulse which determines the effect upon the state of the core, not the voltage alone. In other words, it is necessary to take into account the time occupied by the resetting.

The conditions necessary to secure reset of the core may be deduced from the simplified equivalent circuit of Figure 6. The permeability of the core 36 is very large, so that it may be assumed, to a first approximation, that the magnetising current is independent of the flux density, and hence of the voltage applied to the winding 43. Thus the effect of the winding may be represented by a fictitious resistive element $R_c$ which draws a constant current $I_1$.

The effect of eddy current losses in the core is represented by a shunting resistance R. If there is additional loading, due to an additional winding on the core, for example, this may be combined with the eddy current loss resistance to provide the effective value for the resistor R.

Let V and $I_2$ be the voltage across the capacitor and the current through R at a time $t$, then:

$$V = I_2 R = -\frac{1}{C}\int (I_1 + I_2)\,dt$$

Hence $$\frac{dV}{dt} + \frac{I_1}{C} + \frac{I_2}{C} = 0$$

$$\frac{dV}{dt} + \frac{I_1}{C} + \frac{V}{RC} = 0$$

where C is the capacity of the capacitor 40.

If the capacitor is initially charged to a voltage E, then by integration:

$$V = (E + I_1 R)e^{\frac{-t}{RC}} - I_1 R$$

If T is the time taken to switch the core, the voltage integral of the pulse applied to the winding 43, provided that the capacitor is not discharged to the level of the biasing voltage by the time T, will be:

$$\int_0^T V\,dt = (ERC + I_1 R^2 C)\left(1 - e^{\frac{-T}{RC}}\right) - I_1 RT$$

The voltage integral of a pulse which is just sufficient to switch the core is determined by the constants of the core material and by the number of turns of the winding. It is convenient, therefore, to express it as PN, where P is a constant and N is the number of turns.

The current I, is inversely proportional to the number of turns of the winding 43 and the eddy current loss is proportional to the square of the number of turns, hence let $$I_1 = \frac{S}{N}$$

and $R = kN^2$, where S and $k$ are constants.

The voltage to which the capacitor is charged is determined by the number of turns of the winding 35, and by the constants of the pulsing circuit, hence let $$E = \frac{N}{D}$$

where D is a constant, and the windings 35 and 43 have the same number of turns.

To effect reset, the voltage integral of the pulse produced by the capacitor discharge must be at least equal to PN, hence, substituting:

$$PN = \int_0^T V\,dt = \left(\frac{N}{D} \cdot kN^2 C + Sk^2 N^3 C\right)\left(1 - e^{\frac{-T}{RC}}\right) - SkNT$$

$$P = kN^2 C\left[\left(\frac{1}{D} + Sk\right)\left(1 - e^{\frac{-T}{RC}}\right) - \frac{STk}{RC}\right]$$

$$T = \frac{RC}{Sk}\left[\left(\frac{1}{D} + Sk\right)\left(1 - e^{\frac{-T}{RC}}\right) - \frac{P}{RC}\right]$$

For a typical core, it was found experimentally that the various constants in the above equation had the following values:

$k = .1$ ohm/turn$^2$
$P = .1$ millivolt seconds/turn
$S = 400$ milliamp. turns
$D = 17.5$ Using these constants, if the windings 35 and 43 each have one thousand one hundred turns, and $$\frac{T}{RC}$$

is made equal to .2, then we have $T = 2.1$ milliseconds and $C = .1$ microfarad.

Thus, if the core having these constants is used in the circuits of Figure 5 and the capacitor 40 has a value of .1 microfarad the core will be returned to the first state of saturation after 2.1 milliseconds.

Since the voltage time integral of the resetting pulse is the important property, it is essential to have as large a voltage as possible, if the resetting time T of the core is to be reduced to a minimum. The voltage E, to which the capacitor is charged, is a function of the constants of the counting circuit, so that, from the point of view of resetting, the capacitor should be very large. However, the size is limited by the fact that it must not be so large that it cannot be charged fully by a pulse from the transformer 32.

If the discharge time constant is very large compared to T, the switching time is reduced to approximately 1.75 milliseconds, so that the values chosen provide a practically convenient size of capacitor, without any serious increase in the switching time.

A modified method of obtaining the bias for the diode 42 is shown in Figure 7. An additional winding 45 on the transformer 32 provides sufficient biasing voltage to prevent the capacitor 40 discharging during the counting pulse.

This circuit has the advantage that the discharge, and hence the resetting action, commence as soon as the counting pulse ceases. This reduces the overall time which has to be allowed for resetting and makes the timing of the contacts 44 less critical.

The disadvantage of the circuit over that of Figure 5, is that the capacitor discharges through the winding 43 after every pulse, so that, although it is charged to a small voltage only, by all except the final counting pulse of a cycle, it does tend to effect some resetting action after every pulse. To overcome this, it is necessary to increase the voltage time integral of the pulses supplied by the transformer 32.

From the equations given above, it might appear that it would be advantageous to use as few turns as possible on the reset winding. This is not the case in practice.

The cores 36 will act as a transformer with a large step up ratio during reset. The contacts 37 may be common to several counting circuits, and the large induced voltage will then appear across the diodes, corresponding to the diodes 38, of the remaining counting circuits each time any one of them is reset. If this is avoided by dispensing with the contacts 37, then a large current will circulate in the circuit of the windings 35 and the diodes 38 have to carry a large forward current. This also reduces the amount of energy available for resetting the core. Furthermore, the magnetising current and the eddy current losses both increase, requiring a larger capacitor.

In view of these factors, the use of an equal number of turns on the windings 35 and 43 is a convenient compromise. This also permits the winding 35 to be used for resetting, by connecting the resetting circuit across this winding instead of the winding 43.

From the above equations follows likewise the conclusion already referred to that the input and reset windings of the pulse gate of Figure 1 should have a like number of turns.

From the foregoing it is seen that the distinction between the gating core and the counting core is that the gating core is switched by a single pulse from its first state of saturation to its second state of saturation and each pulse may be used for reset, whereas in the counting core the core is switched progressively by a plurality of pulses, the last of which drives it to its second state of saturation, and only this last pulse may be used for reset to the first state of saturation.

By "diode" is meant any unilaterally conducting device, such as a metal rectifier or a thermionic diode. The generic term "switch" is intended to include not only cam operated circuit breakers and electromagnetic relays but also thermionic valves and thyratrons and the like when connected so as to effect the making and breaking of a circuit or the changing of a potential on a wire from one value to a different value in well-known manner.

What we claim is:

1. Apparatus for automatically resetting a magnetic core to a first limiting state of saturation, consequent upon switching of the core to a second limiting state of saturation, comprising a magnetic core of material with appreciable remanence and a substantially rectangular hysteresis characteristic, a source of input pulses for switching the core from the first state to the second state, an input winding and an output winding on said core, means for applying said pulses to said input winding, a capacitor in series with said input winding, said capacitor being charged by the current flowing through the input winding when the core is switched into the second state of saturation, switch contacts connected directly across said capacitor for determining the charge of the capacitor, and a discharge circuit for the capacitor through said input winding in a direction to switch the core from the second state of saturation to the first state of saturation, the voltage time integral produced across the input winding by the discharge of the capacitor, when it has been charged by a pulse which drives the core into the second state of saturation, being sufficient to switch the core from the second state of saturation to the first state of saturation.

2. Apparatus for automatically resetting a magnetic core to a first limiting state of saturation, consequent upon switching of the core to a second limiting state of saturation, comprising a magnetic core of material with appreciable remanence and a substantially rectangular hysteresis characteristic, a source of input pulses for switching the core from the first state to the second state, several windings on said core, means for applying said pulses to a first winding on the core, a capacitor in series with a second winding on said core, said capacitor being charged by the current flowing through said second winding when the core is switched to the second sttae of saturation, and means permitting the uni-directional discharge of the capacitor through one of the core windings in a direction to switch the core from the second state of saturation to the first state of saturation, the voltage time integral produced across said winding by the discharge of the capacitor, when it has been charged by a pulse which drives the core into the second state of saturation, being sufficient to switch the core from the second state of saturation to the first state of saturation.

3. Apparatus as claimed in claim 2, in which the capacitor discharges through a third winding.

4. Apparatus as claimed in claim 2, having a first diode for effecting uni-directional discharge of said capacitor and switching means for rendering the discharging circuit ineffective except in the interval between successive input pulses.

5. Apparatus as claimed in claim 4, having a second diode in series with said capacitor, connected to allow charging of the capacitor under control of the input pulses.

6. Apparatus as claimed in claim 2, having a first diode for effecting uni-directional discharge of said capacitor, switching means for rendering the discharging circuit ineffective except in the interval between input pulses, a second diode connected in series with said capacitor to permit charging thereof under control of the input pulses, and means for biassing said second diode to prevent charging of said capacitor when the core is already in the second state of saturation.

7. Apparatus as claimed in claim 6, in which the source of bias voltage is connected to be effective only for the duration of each input pulse.

8. Apparatus as claimed in claim 2, having means to prevent charging of the capacitor, in order to suppress automatic resetting.

9. Apparatus as claimed in claim 8, in which the capacitor discharges through a third winding and having a fourth start winding, and means for applying a pulse to said fourth winding to drive the core to the first state of saturation.

10. Apparatus as claimed in claim 2, having an output winding, a first diode for effecting uni-directional discharge of said capacitor, a second diode in series with said capacitor connected to allow charging of the capacitor under control of the input pulses, and a third diode and a load in series therewith, the third diode permitting output pulses to be applied to the load only when the core is switched from either the first to the second state of saturation, or vice versa.

11. Apparatus as claimed in claim 2, having a first diode, a second diode in series with said capacitor charging circuit, for effecting uni-directional discharging of said capacitor, and means for biasing said first diode to prevent discharge of the capacitor except when the capacitor has been charged by a pulse which drives the core into the second state of saturation.

12. Apparatus as claimed in claim 11, having switching means for rendering the discharge circuit ineffective except in the interval between successive input pulses.

13. Apparatus as claimed in claim 12, having a source of constant biassing voltage for said first diode.

14. Apparatus as claimed in claim 12, having means for applying a bias voltage to the first diode for the duration of each input pulse.

15. Apparatus as claimed in claim 14, having means for deriving the biassing voltage from the input pulses.

16. Apparatus as claimed in claim 15, in which a transformer winding provided the input pulses and said transformer has a second winding for supplying the biassing voltage.

References Cited in the file of this patent

UNITED STATES PATENTS

| | | |
|---|---|---|
| 2,375,609 | Zuhlke | May 8, 1945 |
| 2,691,154 | Rajchman | Oct. 5, 1954 |
| 2,713,674 | Schmitt | July 19, 1955 |
| 2,713,675 | Schmitt | July 19, 1955 |
| 2,778,955 | Isborn | Jan. 22, 1957 |

OTHER REFERENCES

IRE National Convention Record, part 7, held March 23–26, 1953, pages 38–42.